United States Patent [19]

Bonne et al.

[11] Patent Number: 5,594,892
[45] Date of Patent: Jan. 14, 1997

[54] METHOD FOR AUTOMATED SOFTWARE APPLICATION TESTING

[75] Inventors: Francois Bonne, Bordeaux; Jean-Marie Grillet, Merignac; Guy Mansel, Pessac; Paul Rouah, Blanquefort, all of France

[73] Assignee: International Business Machines Corporation, Armonk, N.Y.

[21] Appl. No.: 336,358

[22] Filed: Nov. 8, 1994

[30] Foreign Application Priority Data

Dec. 22, 1993 [EP] European Pat. Off. .............. 93480232

[51] Int. Cl.⁶ .............. G06F 11/00; G06F 11/28
[52] U.S. Cl. .............. 395/500; 395/602; 395/704; 364/578; 364/580
[58] Field of Search ............... 395/500, 575, 395/650, 700, 600; 364/578, 580; 371/16.1, 16.2, 19, 27

[56] References Cited

U.S. PATENT DOCUMENTS

| | | | |
|---|---|---|---|
| 4,847,751 | 7/1989 | Nakade et al. ................. | 395/650 |
| 5,045,994 | 9/1991 | Belfer et al. ................. | 395/500 |
| 5,157,782 | 10/1992 | Tuttle et al. ................. | 395/575 |
| 5,218,605 | 6/1993 | Low et al. ................. | 371/16.1 |
| 5,233,611 | 8/1993 | Triantafyllos et al. ................. | 371/16.1 |
| 5,333,252 | 6/1994 | Brewer, III et al. ................. | 395/148 |
| 5,355,497 | 10/1994 | Cohen-Levy ................. | 395/700 |
| 5,367,671 | 11/1994 | Feigenbaum et al. ................. | 395/600 |
| 5,390,325 | 2/1995 | Miller ................. | 395/575 |

FOREIGN PATENT DOCUMENTS

0471924  5/1991  European Pat. Off. .

*Primary Examiner*—Kevin J. Teska
*Assistant Examiner*—Tan Nguyen
*Attorney, Agent, or Firm*—Joscelyn G. Cockburn; John B. Frisone

[57] ABSTRACT

A method for automatically testing a software program; which is provided with a TEST DATA file including all data to test the functions of the program, a SCREEN FIELD MAP file including screen field marks such as field number, title, screen position, etc and an INTER-SCREEN NAVIGATION file for describing interscreen relations, includes the following steps: identifying the screens needed for the test data, getting the identified screens, carrying out the tests and logging all discrepancies.

1 Claim, 4 Drawing Sheets

Fig. 1

| SCREEN FIELD MAP FILE | | | | |
|---|---|---|---|---|
| Field Name | Action Code | Screen name | Mark | |
| Address | CREATE | SCR217 | 05 | 13 |
| Address | MODIFY | SCR342 | 05 | 13 |
| Name | READ | SCR345 | 08 | 09 |
| Serial N° | CREATE | SCR217 | 05 | 05 |
| Serial N° | KEY | SCR345 | 02 | 09 |
| Serial N° | KEY | SCR340 | 09 | 09 |

Fig. 2

| INTER SCREEN NAVIGATION FILE | | | | |
|---|---|---|---|---|
| Source Screen | Command | Motion | Target Screen | Response |
| SCR001 | 2 | FORWARD | SCR126 | |
| SCR126 | *K | FORWARD | SCR127 | |
| SCR126 | *PF03 | BACKWARDS | SCR001 | |
| SCR126 | *PF06 | FORWARD | SCR129 | |
| SCR127 | *S | FORWARD | SCR139 | |
| SCR127 | *PF03 | BACKWARDS | SCR126 | |
| SCR127 | *K2 | | | PRINT |
| SCR127 | *PF12 | BACKWARDS | SCR001 | DELETE |

| Action Code | | | | |
|---|---|---|---|---|
| K | Field_Name1 | data1 | | |
| K M | Field_Name2 | data2 | | |
| K M | Field_Name3 | data3 | | |
| | Field_Name4 | data4 | | |
| | Field_Name5 | data5 | screen_name1 | 11_cc1 |
| | Field_Name6 | data6 | screen_name2 | 11_cc2 |
| | Field_Name7 | data7 | screen_name3 | 11_cc3 |
| Objective_screen: | | | screen_name3 | |

Fig. 5

| Source Screen | Command | Motion | Target Screen |
|---|---|---|---|
| SCR321 | *PF12 | BACKWARDS | SCR315 |
| SCR315 | *PF12 | BACKWARDS | SCR126 |
| SCR126 | *K | FORWARD | SCR127 |
| SCR127 | *S | BACKWARDS | SCR126 |

Fig. 6

METHOD FOR AUTOMATED SOFTWARE APPLICATION TESTING

The present invention relates to tests of a software application in general, and in particular to a method for automated software application testing with relational data base.

With the increasing number of software applications being developed worldwide and the increasing complexity of every single one of them, there is a growing need in the industry for a tool to assist developers in testing efficiently and accurately their software applications.

The prevalent method in the industry for testing software applications is the use of a robot which records keystrokes then replays them. This method implies writing a TEST DATA document, then recording and playing back. The periodical publication NEWS 3X/400, which deals with the AS/400 system (system using a relational data base), has presented lastly two products: QES/Architect and WITT (February, 1993 issue). Both products have the same approach: keystroke record and play back with the possibility of having TEST DATA independent of the SCREEN FIELD MAP.

With these available prior art testing tools, the keystroke recording and playing back is especially fit for a ready to use software application. For all changes in such an application however, it becomes difficult to find the changes in the files of the recording, and to directly operate in the file. Thus, the only method left is proceeding with another recording and replaying for part of the application. With QES/Architect or WITT products, the independence of TEST DATA versus SCREEN FIELD MAP exists but there is no independence between the TEST DATA and the INTER-SCREEN NAVIGATION: TEST DATA cannot distinguish between data for the functions from data for navigation purpose.

The method for automated software application testing according to the invention presents over the QES/Architect or WITT products the advantage that independence of the three entities (TEST DATA, SCREEN FIELD MAP, INTER-SCREEN NAVIGATION) improves:

the writing of the TEST DATA for functional testing, by using the data base, the use of the specifications for INTER-SCREEN NAVIGATION data (these specifications being coded according to the computer programs explained further in the present description of the invention), and the change of one of the three entities without modification of the two others.

A further improvement is the writing of the TEST DATA for functional testing without knowing the SCREEN MAP and the INTER-SCREEN NAVIGATION specifications. This is specially useful when the application screens (i.e. the various displayed screens proposed by the application in the course of its running, to a user) are issued by an Application Language Generator, according to its own standard, and which are sometimes only available at the end of the coding.

Besides the three entities, the LOGIC implemented in the testing method according to the invention, automatically emulates the terminal with the TEST DATA, using the above three entities. An advantage of that LOGIC outside the three entities is the possibility, by changing the LOGIC, to use the same TEST DATA for a software application generated on different platforms (AS/400, RISC, etc. . . . ).

The invention includes a method to run an automated software application testing, using three entities:

TEST DATA file, containing all data to test the functions of the software application, SCREEN FIELD MAP file, containing the screen field marks (i.e. the field number, its position in the screen, its title, etc. . . . ), and INTER-SCREEN NAVIGATION file, describing the inter-screen relation, the method comprising a logic to:

find the screens needed for the test data, get these screens and carry out the tests, and log all the discrepancies.

More particularly, the invention includes a method for automated software application testing thru a plurality of test steps, in a computer for running said software application and equipped with displaying and keying-in means and including therein:

a TEST DATA file, containing data to test the functions of the software application, a SCREEN FIELD MAP file, containing specifications of the fields of the screens displayed to a user by the software application in the course of its running, and a INTER-SCREEN NAVIGATION file, containing the specifications of the relations between said screens, the said method comprising:

collecting useful data for each of said plurality of test steps and saving them in a STEP DATA work file, searching for each of said plurality of test steps, for a path linking said screens, and making up a PATH work file, and emulating for each of said plurality of test steps the keying-in by a user using said application program.

The invention will be better understood from the following detailed description read in conjunction with the following schematics.

The three entities are explained thereafter, in conjunction with the figures.

Figure 1:
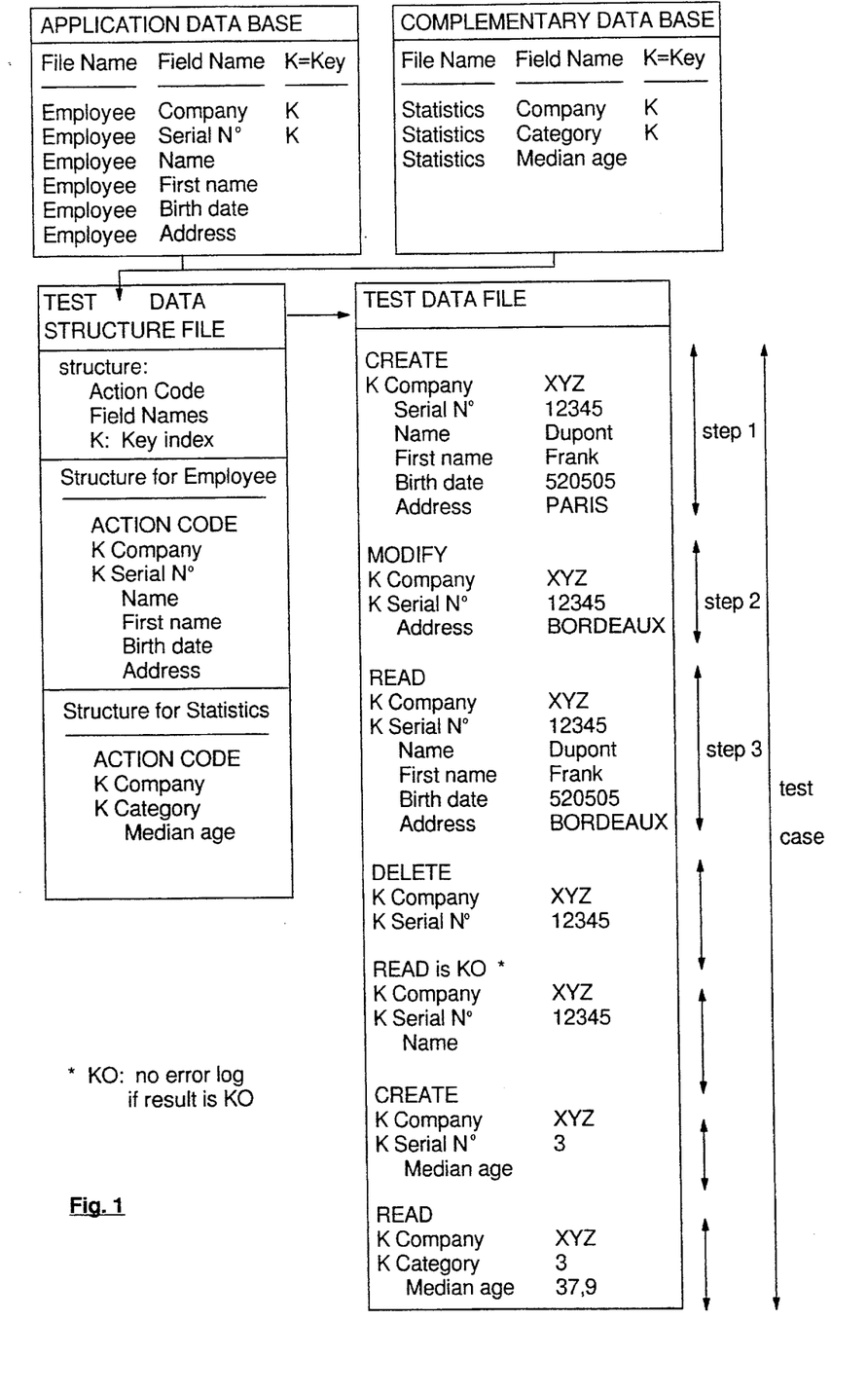
FIG. 1 shows a TEST DATA file, built up with the present method from an Application data base and a Complementary data base.

1. TEST DATA file in FIG. 1, contains data for the tests of the functions. Each test step is built regarding one data base file and follows the structure:

1st record: ACTION Code, with the following classification:

active ACTION Code, such as CREATE, MODIFY, passive ACTION Code, such as READ, result such as PRINT, DELETE, Next records: Field names of the data base file, with their data and an index for selection Key Fields.

Key Fields are selection fields of the relational data base.

The TEST DATA files are obtained in two stages: Firstly, the structure of a test step is made up from an Application data base and a Complementary data base. The Application data base is the data base of the software application. The Complementary data base has been 'manually' built up with the fields which are not taken into account by the Application data base but described in the specifications, such as options for data processing, prints, etc. . . Then, the TEST DATA with ACTION Codes are written by copy from the structure.

Figure 2:
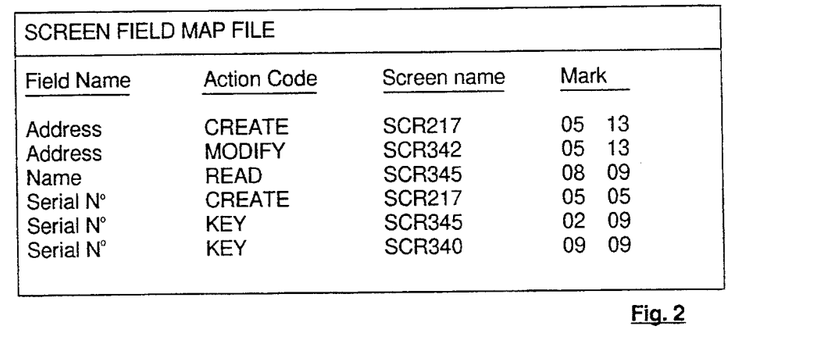
FIG. 2 shows the format of the SCREEN FIELD MAP file. It can be the screen specifications.

2. SCREEN FIELD MAP FILE in FIG. 2, contains the specifications of the screen fields. Each record has the following format:

Field name,

ACTION Code,

Screen name,

Field mark, to locate the field on the screen (it can be the field number, its position, its title, etc. . . .).

A key field of the TEST DATA file is related to several screens in the SCREEN FIELD MAP file.

A non-key field of the TEST DATA file is related to one screen per ACTION Code in the SCREEN FIELD MAP File.

The SCREEN FIELD MAP file can by obtained in two ways:

- the first way is to get SCREEN FIELD MAP file as screen specifications for the application: that specification is coded as in the invention.
- the second way is to process the Screen Definition Source files of the application mock-up, when it exists and is approved: these files contain three fields (field name, screen name, and Mark, which is the position in the screen given for example by two figures that are the line number and the column number), the fourth one (Action Code) being issuable from a standard (screen name for example) or put 'manually'.

Figure 3:
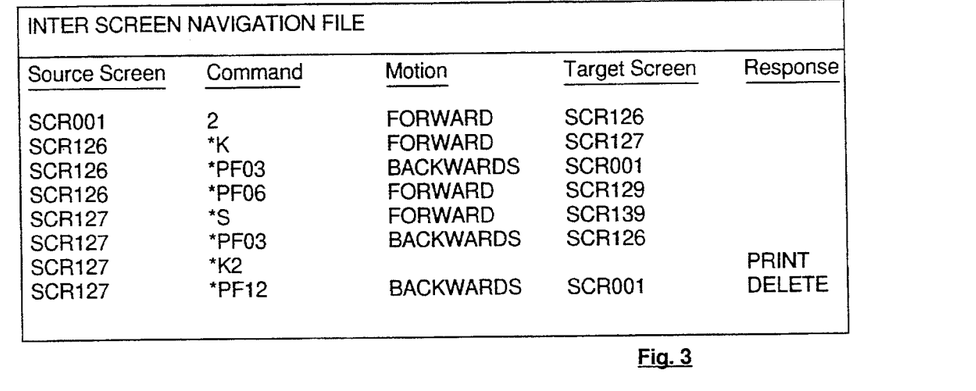
FIG. 3 shows the format of the INTER-SCREEN NAVIGATION file. It can be the inter-screen navigation specifications.

3. INTER-SCREEN NAVIGATION FILE in FIG. 3, contains the inter-screen relations. Each record has the following format:

SOURCE SCREEN name,

COMMAND, a code for succession of key-ins and commands which applied on that screen, provides the results as seen further, MOTION ('forward', 'backwards'), when the COMMAND causes a change of screen (blank field if there is no MOTION), TARGET SCREEN name (blank field if there is no MOTION), Response, if the COMMAND causes print or delete.

The INTER-SCREEN NAVIGATION file can be obtained in so far as a part of the specification of the application: that specification is coded as in the invention with the following Command code corresponding to the following Action:

| COMMAND | ACTION |
| --- | --- |
| Direct COMMANDS | |
| x | -1-Key-in 'x' on the SOURCE SCREEN<br>-2-'Enter' key |
| *PFk | -1-PFk key |
| Selection COMMANDS | |
| *K | -1-Key-in the key data of the test step on the SOURCE SCREEN<br>-2-'Enter' key |
| *Ki | -1-Selects, on the SOURCE SCREEN, the record with the key data of the test step, and marks it with 'i'<br>-2-'Enter' key |
| Input COMMANDS | |
| *S | -1-Inputs, on the SOURCE SCREEN, the non-key data of the test step<br>-2-'Enter' key |
| Other COMMANDS | |
| *K*S | -1-Key-in the key data of the test step on the SOURCE SCREEN<br>-2-Inputs, on the SOURCE SCREEN, the non-key data of the test step<br>-3-'Enter' key |
| C1(C2 | -1-any above command C1<br>-2-any above COMMAND C2<br>ex: *K(*S<br>ex: *Ki(*Pfk |

TEST DATA running

Figure 4:
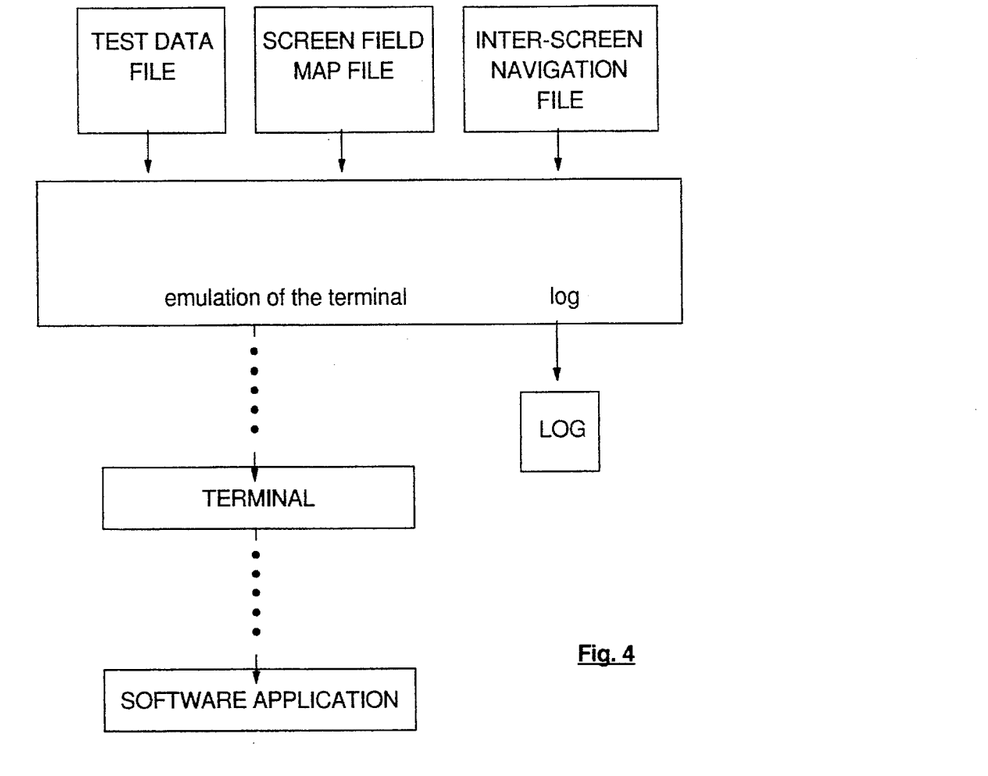
FIG. 4 shows the architecture of the method for automated software application testing according to the invention.

FIG. 4 shows the architecture of the method according to the invention. All files and programs are in a workstation connected to the software application. Hereunder are listed parts of programs included in the logic of the method according to the invention for automation of one test step. The used Program Design Language allows the man skilled in the art to understand the invention. Usual sequences as chaining of test data, error management, etc. . . . are not described. The following definitions are provided for a better explanation:

| Definitions | |
|---|---|
| Test Step | Group of data for an elementary ACTION: CREATE or READ or MODIFY, etc (see FIG. 1) |
| Entrance Screen | The first screen of the application |
| Current Screen | The screen where the application stands |
| Prior Screen | The current screen, before starting a new Test Step |
| Objective Screen | One or several screens are needed to key-in the Test Step data: the last one is called the 'Objective Screen' |
| Ultimate Screen | The screen after the Test Step is over |
| Forward Path | When the application calls new screens, it's on the 'Forward Path' |
| Backwards Path | When the application returns to previously called screens it is on 'Backwards Path' |
| Cross Screen | The screen as the crossing of 'Backwards Path' and the 'Forward Path' |
| Key Field | A field which is a selection field of the relational data base |
| Forward Path Non mandatory key work file | File saving all the Key Fields with their TEST DATA for the 'Forward Path' linking the Entrance Screen and the Current Screen |

Thus, according to the invention, a call is successively made to three computer programs: TEST DATA Collect, PATH SEARCH, and TEST STEP EMULATION. They are listed below in a high level language that can be understood by the man skilled in the art. Comments are imbedded between /* and */ for an even better understanding.

TEST DATA Collect

Figure 5:
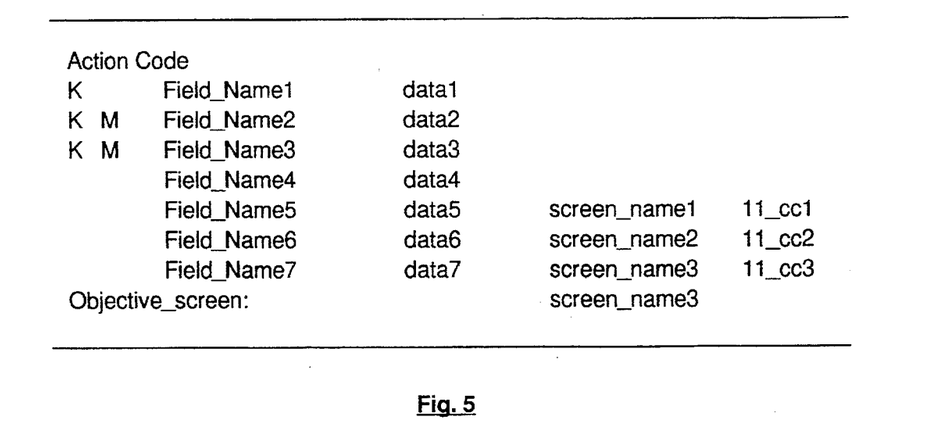
FIG. 5 shows the STEP DATA work file to explain the running of automated software application testing according to the invention.

Its object is to collect useful data for the Test Step and save them in a STEP DATA work file (See FIG. 5: 'K' being the index for Key Field, 'M' the index for mandatory Key Field, 'Objective_Screen' an index for the Objective Screen, and 'll_cc' a screen position).

```
/* Collect TEST DATA */
> Read the next Test Step in the TEST DATA file
> Write to STEP DATA work file
        ACTION Code,
        all Key Field names, their related data and the index K
        all non-Key Field names and their related data
/* Add Screen names and Marks for non-Key Field names */
> Do For every composite key (ACTION Code / Non-Key Field name)
> Read the SCREEN FIELD MAP file
> Write the screen name and Mark to STEP DATA work file for the related
        composite (ACTION Code / Non-Key Field name)
        /* the Mark here is ll_cc*/
> Enddo
> Define Objective Screen = the last screen name, for the Read step above
/* Define mandatory Key Fields */
> Do for every composite key (Key Field name / data) of STEP DATA work file
> IF not in the Forward Path Non Mandatory Key work file:
        /* this file is detailed with routine 3 */
> Write in the STEP DATA work file an index M for related
        composite (Key Field name / data)
> Endif
> Enddo
```

PATH SEARCH

Its object is to search the path needed for the Test Step. It links Prior Screen, Cross Screen, Objective Screen and Ultimate Screen, and makes up a PATH work file as seen FIG. 6.

Figure 6:
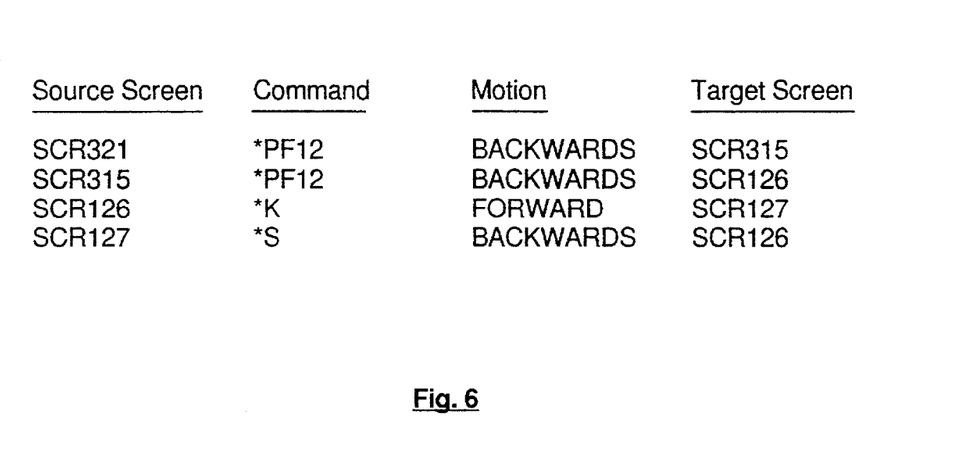
FIG. 6 shows the PATH work file to explain the running of automated software application testing according to the invention.

It is made up of five routines as follows:

Routine 1 consists in searching a Forward Path between the Objective Screen and the Entrance Screen, and saving it in the PATH work file:

An example of STEP DATA work file is the following:

| MODIFY | | | | | |
|---|---|---|---|---|---|
| K | Company | XYZ | | | |
| K M | Serial N_e | 12345 | | | |
| | Address | BORDEAUX | SCR342 | 05 13 | |
| | Objective_screen: | | SCR342 | | |

```
> Initial condition: TARGET SCREEN = Objective Screen
> Do while TARGET SCREEN not equal to Entrance Screen
> Read the INTER-SCREEN NAVIGATION file for the composite key
        (MOTION = 'FORWARD' / TARGET SCREEN)
> Write the record to PATH work file
> TARGET SCREEN = SOURCE SCREEN, from the above record
> Enddo
> Call the subroutine: MKF (for: Mandatory Key Field) CHECKING,
> If the MKF CHECKING is KO: search another path, i.e. restart routine 1
```

The logic towards finding other paths is not part of the present invention.

Routine 2 allows to search the Ultimate Screen:

```
/* If the ACTION Code is passive (such as READ) there is no MOTION */
> If ACTION Code = READ
> WRITE to PATH work file the following record
        (SOURCE SCREEN = Objective Screen and COMMAND = READ)
> Endif
/* Search for active ACTION Code (such as CREATE, MODIFY) */
> If ACTION Code = CREATE or MODIFY
> Read the INTER-SCREEN NAVIGATION file for the composite key
        (SOURCE SCREEN / COMMAND) = (Objective Screen / *S)
>Write the record in PATH work file
> Endif
/* Search for ACTION Code which are result such as PRINT, DELETE */
> If ACTION Code = PRINT or DELETE
> Read the INTER-SCREEN NAVIGATION file for the composite key
        (SOURCE SCREEN / response) = (Objective Screen / ACTION Code)
> Write the record in PATH work file
> Endif
```

Routine 3 allows to update a Forward Path Non Mandatory Key work file:

```
> Build up the list of screens of the following path:
> If the Ultimate Screen is reached with the MOTION 'Forward':
take the Forward Path defined at the end of the Routine 2 by the
PATH work file.
> If the Ultimate Screen is reached with the MOTION 'Backwards':
take the Forward Path (defined at the end of the routine 2 by the PATH work file)
between the Entrance Screen and the Ultimate Screen.
> Do For all the Key Field names of the above screen list
> WRITE the Forward Path Non Mandatory Key work file with
(Key Field name and its data used in the Test Step)
> Enddo
```

Routine 4 allows searching the Backwards Path between the Prior Screen and the Cross Screen. Save in the PATH work file:

```
> Initial condition: SOURCE SCREEN = Prior Screen
> Do until crossing the Forward Path (i.e. until Cross Screen)
> Read the INTER-SCREEN NAVIGATION file for the composite key
        (MOTION = 'BACKWARDS' / SOURCE SCREEN)
> Write the record to PATH work file
> SOURCE SCREEN = TARGET SCREEN
> Enddo
```

Routine 5 sets the path for the Test Step:

---

> Set the PATH work file in the same order as the screens passes:
> Backwards Path
> Forward Path between the Cross Screen and the Objective Screen
> Call the subroutine: MKF CHECKING,
> If the MKF CHECKING is KO: search another Bachwards Path (i.e. restart at routine 4, after refreshing the PATH work file in the status of the Routine 4 beginning)

---

The logic towards finding other paths is not part of the present invention.

The subroutine: MKF Checking, has as an object to check whether each mandatory Key Field name of STEP DATA work file has an input in the path described in PATH work file:

---

> Do for each mandatory Key Field name of STEP DATA
> Check the link between recors of the 2 files
    SCREEN FIELD MAP file        PATH file
    Field name = mandatory Key Field name
    ACTION Code = 'KEY'
    Screen name =                       Screen name
> Enddo

---

TEST STEP EMULATION

Its object is to emulate the terminal from the PATH work file. It is to be noted that the following explanation is valid for ONE Test Step. Keying-in is at this point related to a COMMAND code according to explanation with respect to FIG. 3 above.

---

> Initial condition: the application is at the Current Screen = Prior Screen
> READ sequentially the PATH work file to get COMMAND and TARGET SCREEN
> If the COMMAND = a Selection COMMAND (*K or *Ki)
> Do until end of file
> Read SCREEN FIELD MAP file for the composite key
    (screen name / ACTION Code) = (Current Screen / 'KEY')
    to get the Mark and the Field name
> Emulation: Set the cursor for the Mark
> Read the STEP DATA work file for the Field name to get the data
> Emulation: key-in the data
> Enddo
> Emulation: 'Enter' key
> If COMMAND = *Ki: key-in 'i' on the index zone then 'Enter'
> Call routine: Screen Identification Checking for TARGET SCREEN
> Endif
> If COMMAND = an Input COMMAND (such as *S)
> Do until end of file
> Read sequentially STEP DATA work file for screen name = Current Screen
                to get Mark and data
> Emulation: Set the cursor for the Mark and key-in of the data
> Enddo
> Emulation: 'Enter' key
> Call routine: Screen Identification Checking for TARGET SCREEN
> Endif
> If COMMAND = a Direct COMMAND (such as x or *PFi)
> Emulation: Key-in (x plus 'Enter') for COMMAND x,
or key-in PF-key according to *PFi
> Call routine: Screen Identification Checking for TARGET SCREEN
> Endif
> If COMMAND = Passive COMMAND (such as READ)
> Do until end of file
> Read sequentially STEP DATA work file for screen name = Current Screen
    to get Mark and data
> Emulation: Set the cursor for the Mark and read
> Compare reading with data
> If comparison is not OK: log a message.
> Enddo
> Endif A routine allows Screen Identification Checking:

```
> Initial condition: TARGET SCREEN name
> Check the identification of the Current Screen (it can be the screen name)
> If not OK
> Log a message
> Synchronize by emulation of backwards PFkey until a known screen
/*In the present embodiment, synchronization is at the Entrance Screen*/
> Endif
```

The man skilled in the art will appreciate that some variations can be implemented such as multiple available paths, checking of messages, etc. . . . without departing from the scope of the present invention.

We claim:

1. A method for automatically testing a software application program by executing a plurality of test steps in a computer running the program and equipped with a displaying means for displaying information and a keying means for entering data into the computer, said computer also including;

a TEST DATA file containing data for testing the program, a SCREEN FIELD MAP file containing a record for each screen specifying fields to be displayed, and an INTER-SCREEN NAVIGATION file containing information defining the sequential relationships between the screens, said method including the following steps:

collecting useful data for each of the test steps to be executed from the TEST DATA file and the SCREEN FIELD MAP file and storing the data in a STEP DATA work file;

for each of said test steps searching the INTER-SCREEN NAVIGATION file; for a Forward Path between an Objective Screen and an Entrance Screen, for an Ultimate Screen and for a Backwards Path between a Prior Screen and a Cross Screen; updating a Path work file setting the path for each of the test steps; and, reading the PATH and STEP DATA work files in a predetermined sequence for emulating keying in by a user to the computer, for each of said test steps, the data stored in the STEP DATA work file to test the application program.

* * * * *